(12) United States Patent
Bromberg et al.

(10) Patent No.: US 6,560,958 B1
(45) Date of Patent: May 13, 2003

(54) EMISSION ABATEMENT SYSTEM

(75) Inventors: Leslie Bromberg, Sharon, MA (US); Daniel R. Cohn, Chestnut Hill, MA (US); Alexander Rabinovich, Swampscott, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/379,003

(22) Filed: Aug. 23, 1999

Related U.S. Application Data

(63) Continuation-in-part of application No. 09/182,537, filed on Oct. 29, 1998.

(51) Int. Cl.⁷ .................................. F01N 3/00
(52) U.S. Cl. ........................ 60/275; 60/286; 60/295; 60/301
(58) Field of Search ............... 60/275, 286, 295, 60/297, 299, 301; 422/186, 907

(56) References Cited

U.S. PATENT DOCUMENTS

| | | | |
|---|---|---|---|
| 5,272,871 A | * 12/1993 | Oshima et al. | 60/275 |
| 5,409,784 A | 4/1995 | Bromberg et al. | 429/13 |
| 5,412,946 A | * 5/1995 | Oshima et al. | 60/286 |
| 5,425,332 A | 6/1995 | Rabinovich et al. | 123/3 |
| 5,437,250 A | 8/1995 | Rabinovich et al. | 123/3 |
| 5,441,401 A | 8/1995 | Yamaguro et al. | 431/4 |
| 5,599,758 A | 2/1997 | Guth et al. | 502/34 |
| 5,847,353 A | * 12/1998 | Titus et al. | 219/121.36 |
| 5,852,927 A | * 12/1998 | Cohn et al. | 60/39.05 |
| 5,887,554 A | * 3/1999 | Cohn et al. | 123/DIG. 12 |
| 5,894,725 A | * 4/1999 | Cullen et al. | 60/285 |
| 5,910,097 A | 6/1999 | Boegner et al. | 60/278 |
| 5,921,076 A | * 7/1999 | Krutzsch et al. | 60/286 |
| 5,974,791 A | * 11/1999 | Hirota et al. | 60/286 |
| 6,047,543 A | * 4/2000 | Caren et al. | 60/275 |
| 6,048,500 A | * 4/2000 | Caren et al. | 422/186.3 |
| 6,082,102 A | * 7/2000 | Wisssler et al. | 60/286 |
| 6,122,909 A | * 9/2000 | Murphy et al. | 60/286 |
| 6,125,629 A | * 10/2000 | Patchett | 60/286 |
| 6,134,882 A | * 10/2000 | Huynh et al. | 60/286 |
| 6,152,118 A | * 11/2000 | Sasaki et al. | 60/278 |
| 6,176,078 B1 | * 1/2001 | Balko et al. | 60/275 |

FOREIGN PATENT DOCUMENTS

| | | |
|---|---|---|
| JP | 07292372 | 11/1995 |
| WO | WO 94/03263 | 2/1994 |
| WO | WO 98/45582 | 10/1998 |

OTHER PUBLICATIONS

U.S. patent application Ser. No. 09/182,537, Bromberg et al., filed Oct. 29, 1998.

* cited by examiner

Primary Examiner—Thomas Denion
Assistant Examiner—Diem Tran
(74) Attorney, Agent, or Firm—Choate, Hall & Stewart

(57) ABSTRACT

Emission abatement system. The system includes a source of emissions and a catalyst for receiving the emissions. Suitable catalysts are absorber catalysts and selective catalytic reduction catalysts. A plasma fuel converter generates a reducing gas from a fuel source and is connected to deliver the reducing gas into contact with the absorber catalyst for regenerating the catalyst. A preferred reducing gas is a hydrogen rich gas and a preferred plasma fuel converter is a plasmatron. It is also preferred that the absorber catalyst be adapted for absorbing $NO_x$.

24 Claims, 6 Drawing Sheets

EMISSION ABATEMENT SYSTEM

This is a continuation-in-part of U.S. patent application Ser. No. 09/182,537 filed Oct. 29, 1998.

This invention was made with government support under Grant Numbers DE-FG07-98ID13601 and DE-FG04-95AL88002, awarded by the Department of Energy. The government has certain rights in the invention.

BACKGROUND OF THE INVENTION

This invention relates to an emission abatement system and more particularly to $NO_x$ abatement using on board plasma-fuel-converter manufactured reducing gases in conjunction with an $NO_x$ absorber catalyst.

In order to reduce harmful emissions, internal combustion engines may be equipped with $NO_x$ absorber catalysts (also known as $NO_x$ traps or $NO_x$ absorbers) to reduce the amount of this harmful substance being released into the environment. There is a particularly pressing need for $NO_x$ and particulate control in diesel engines where pollution abatement is far less effective than in spark ignition engines.

The use of hydrogen gas as a reducing gas for $NO_x$ absorber catalyst regeneration has been taught by Boegner, et. al., in U.S. Pat. No. 5,910,097 and by Gath, et. al., in U.S. Pat. No. 5,599,758. However, a practical source of hydrogen that is well suited in To this application was not identified. Sources other than a plasma fuel convertor can have disadvantages of relatively large size, inefficient use of fuel, slow response and difficulties in elimination of carbon formation from diesel and other fuels. Use of a plasma fuel converter removes these difficulties. A plasma fuel converter also has the advantages of robustness to sulfur and capability for varying the mix of hydrogen rich gas. The present application teaches how a plasma fuel converter can be employed in various combinations with SCR and $NO_x$ absorber catalysts. The plasma fuel converter is operated in such a way as to minimize cost and power losses.

U.S. patent application Ser. No. 09/182,537 filed Oct. 29, 1998, of which this application is a continuation-in-part and whose disclosure is incorporated herein by reference, disclosed utilizing the hydrogen rich gas from a plasma fuel converter to make a catalytic converter more active. That application also teaches that combustion of the hydrogen rich gas on catalytic surface increases the temperature of the catalyst and can be used for quick turn-on of the catalyst during cold startup. That patent application uses plasmatrons as the plasma fuel converter. U.S. Pat. Nos. 5,425,332; 5,437,250; and 5,887,554, whose teachings are incorporated herein by reference, describe plasmatrons suitable for use in the present invention.

SUMMARY OF THE INVENTION

In one aspect, the emission abatement system of the invention includes a source of emissions and an absorber catalyst or selective catalytic reduction (SCR) catalyst for receiving the emissions. A plasma fuel converter for generating a reducing gas from a fuel source is connected to deliver the reducing gas into contact with the absorber catalyst or SCR catalyst for regenerating the catalyst. In a preferred embodiment, the reducing gas is a hydrogen rich gas produced by a plasmatron which may be a partial oxidation plasmatron. The hydrogen-rich gas includes hydrogen and carbon monoxide. A catalyst may be disposed between the plasma fuel converter and the absorber catalyst to enhance the conversion to hydrogen rich gas. The source of emissions may be the exhaust from an internal combustion engine such as a diesel or a spark ignition engine or the exhaust from a turbine, boiler or burner in either a stationary or mobile configuration. In another embodiment, the system delivers at least a portion of effluent from the absorber catalyst to an input to the plasma fuel converter. In another embodiment, the system delivers at least a portion of effluent from the absorber catalyst to an input to the source of emissions such as a diesel engine. In another embodiment an oxidizing catalyst is positioned after the absorber catalyst or SCR catalyst in order to eliminate unreacted reducing components.

In yet another embodiment, a valve is provided for preventing the exhaust emissions from entering the absorber catalyst during absorber catalyst regeneration. A second absorber catalyst may be provided for receiving the emissions during regeneration of the first absorber catalyst. A second plasma fuel converter may be provided to deliver reducing gases to the second absorber catalyst. A portion of the hydrogen rich gas from the plasma fuel converter may be delivered to an input to the source of emissions which could be an internal combustion engine, turbine, boiler or burner. In a preferred embodiment, the absorber catalyst treats $NO_x$ emissions. The system of the invention may also treat particulates and CO emissions.

DESCRIPTION OF THE PREFERRED EMBODIMENT

In this specification, the term absorber catalyst describes systems used for trapping harmful or noxious emissions and then chemically reducing the harmful or noxious emissions during regeneration periods. An example is the well known $NO_x$ absorber catalyst. The process of trapping may be either catalytic absorption or adsorption or conventional absorption or adsorption as taught in U.S. Pat. No. 5,599,758 to Guth, et al. Alternatively, harmful or noxious emissions can be trapped in one system and then released and treated in a downstream unit (engine or catalyst). In such a downstream unit, a hydrogen rich gas is used to reduce the harmful or noxious emission.

Plasma fuel converter (plasmatron) characteristics have been described in the United States patents referred to above. Plasma fuel converters suitable for the present invention utilize electrical discharges to produce hydrogen rich gas and include DC current plasmas, plasmas with time varying currents and pulsed plasmas. The plasma fuel converters can be used in partial oxidation operation over a range of ratios of oxygen to fuel carbon. A typical range is 1 to 2. Steam and $CO_2$ can also be used as oxidants either by themselves or in combination.

Figure 1:
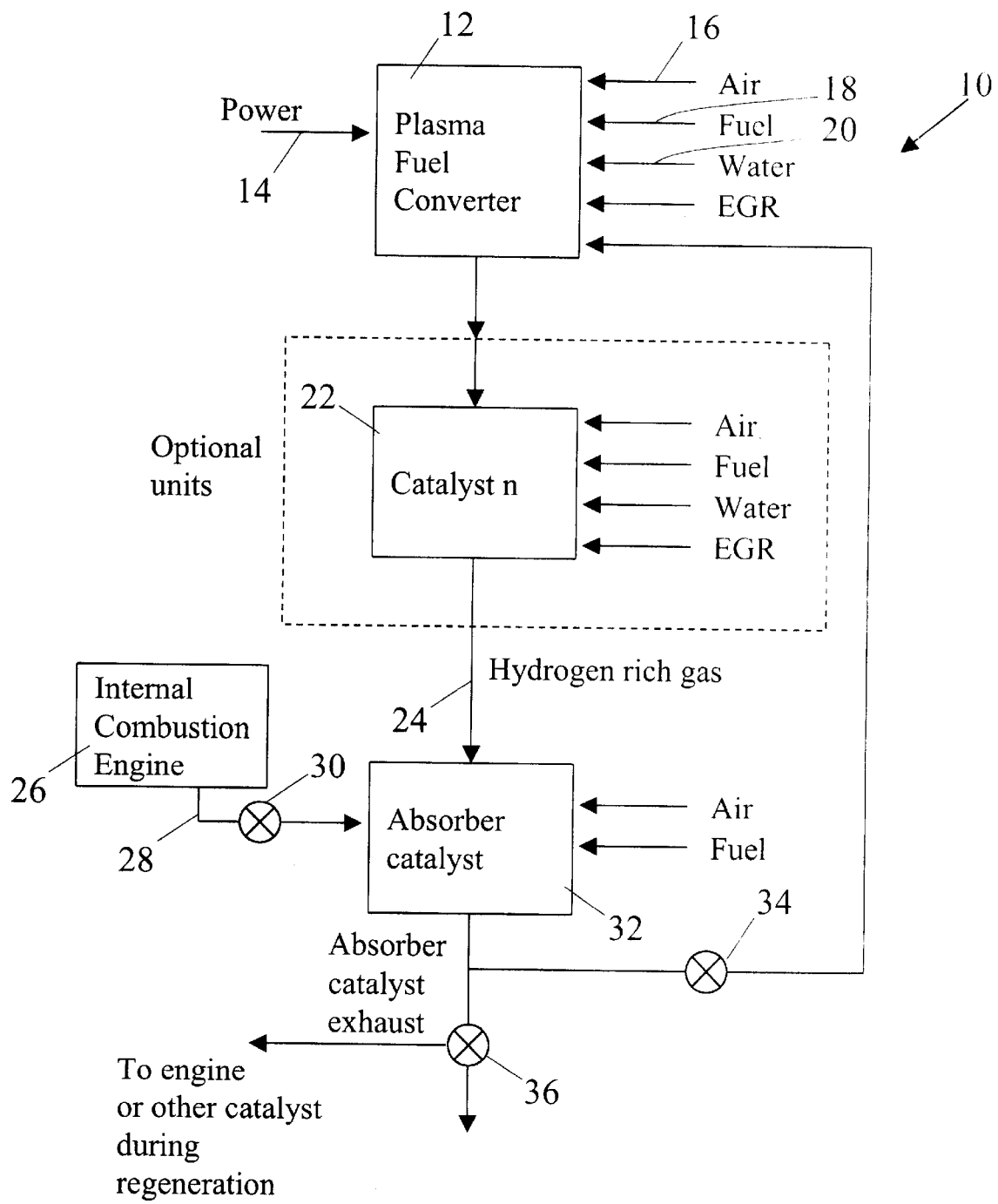
FIG. 1 is a block diagram of the emission abatement system of the invention.

With reference now to FIG. 1, an emission abatement system 10 includes a plasma fuel converter 12 which may be a plasmatron. The plasma fuel converter 12 receives electrical power 14 and also receives air 16, fuel 18 and water 20. The plasma fuel converter 12 will reform the hydrocarbon fuel 18 and there may be provided an optional catalyst or catalysts 22 to produce a reducing gas such as a hydrogen rich gas 24.

An internal combustion engine 26 generates an exhaust 28 which passes through a valve 30 into an absorber catalyst 32. In a preferred embodiment, the absorber catalyst 32 is adapted to treat $NO_x$. That is, the absorber catalyst 32 will trap $NO_x$ present in the exhaust 28 of the internal combustion engine 26. The absorber catalyst 32 is regenerated by the hydrogen rich gas 24 which reduces the $NO_x$ in the absorber catalyst 32 to nitrogen ($N_2$). The hydrogen rich gas 24 produced by the plasma fuel converter 12 may not be fully consumed in the absorber catalyst 32 and can be recirculated by passing through a valve 34 into the plasma fuel converter 12. Some of the gas from the absorber catalyst 32 needs to be removed from the system during regeneration to allow for the introduction of additional plasma fuel converter-generated hydrogen rich gas. If not sufficiently clean, the removed gas can be injected into the engine 26 through a valve 36. Note that the valve 30 is closed during regeneration of the absorber catalyst 32 and the valves 34 and 36 are open during such regeneration. The use of gas from the absorber catalyst 32 in the plasma fuel converter 12 and/or in the internal combustion engine 26 is an important aspect of the present invention.

The gas exiting the absorber catalyst 32 contains hydrogen, CO, $CO_2$, nitrogen and some water. There may even be some $NO_x$ that is released, not having been treated (reduced) by the reducing gas in the absorber catalyst 32. The presence of $CO_2$ and water in the exhaust from the absorber catalyst 32, when reintroduced into the plasma fuel converter 12, or in the additional air 16 injected into the plasma fuel converter 12 helps the reformation process, generating additional hydrogen from either $CO_2$ reforming or water-reforming or from water-shifting the CO into $CO_2$ and additional hydrogen.

Figure 2:
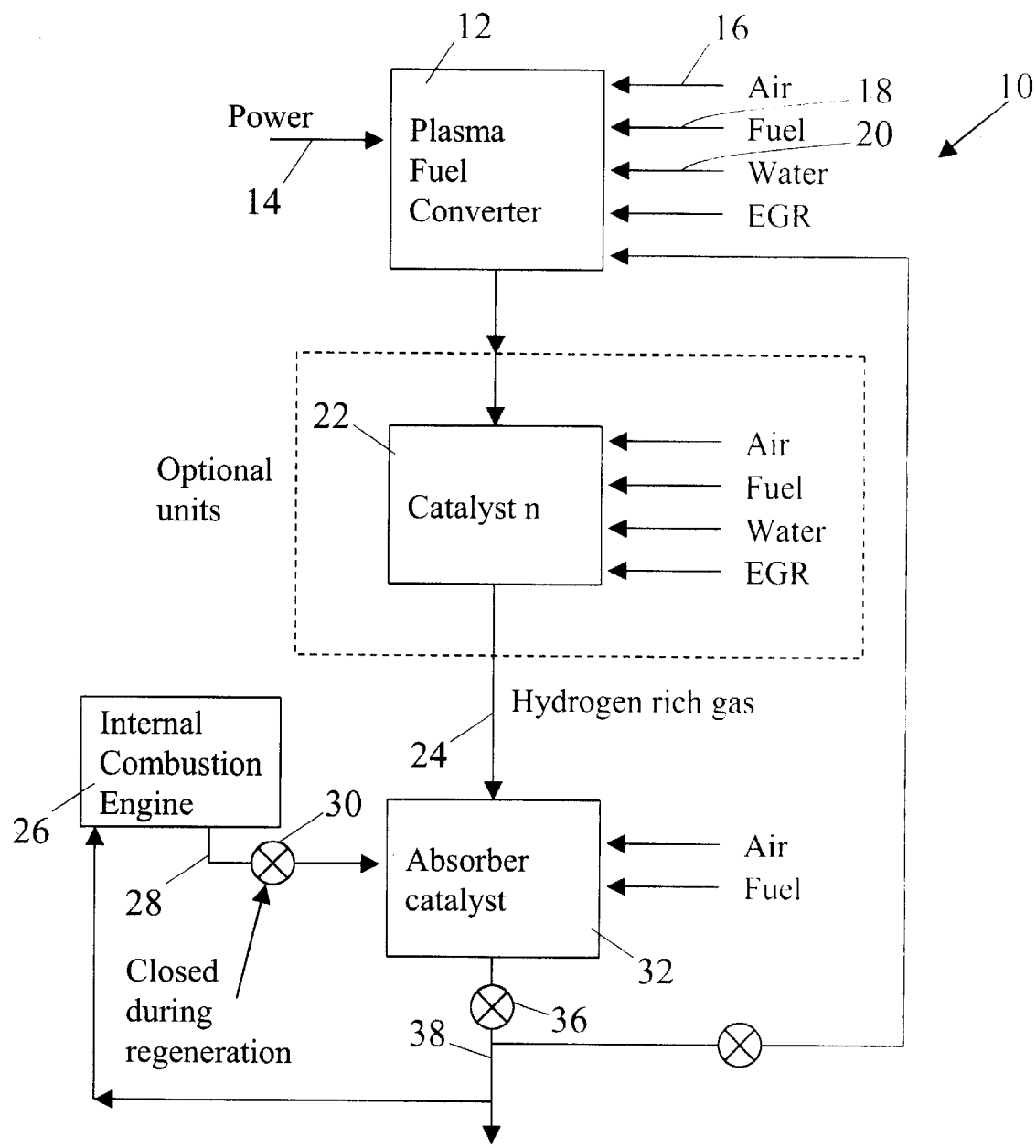
FIG. 2 is a block diagram similar to the block diagram of FIG. 1.

A different approach is shown in FIG. 2 in which exhaust 38 of the closed-cycle $NO_x$-absorber catalyst 32 during regeneration is reinjected into the engine 26 by opening the valve 36 so exhaust can go into the engine or pass through an alternative catalyst (not shown) in systems with tandem catalysts described below. There are several advantages of this mode of operation: any parasitic emissions from the absorber catalyst 32 would be injected into the engine where they would be treated (this is the case for unburned hydrocarbons, CO, and even $NO_x$). A second advantage is that the hydrogen rich gas 24 that is not used in the absorber catalyst 32 can be used for power production in the engine thereby increasing overall efficiency of the system.

In the case of a single $NO_x$-absorber catalyst, the plasma fuel converter can be used for producing hydrogen-rich gas for operating in highly reducing atmospheres for brief periods of time required for reducing and releasing $NO_x$ in the catalyst. Depending on the specifics of the $NO_x$-absorber catalyst system, operating times on the order of 1–5 seconds are required.

In the case of a single $NO_x$ absorber catalyst or SCR catalyst it may be necessary to place an oxidation catalyst downstream from the $NO_x$ absorber catalyst or SCR catalyst. The advantage of this approach is that there is no need for a second catalyst or high temperature valves to switch from one catalyst to the second catalyst, or to redirect the outlet of either catalyst to be reinjected into the engine. The purpose of the oxidation catalyst is to oxidize any leftover hydrogen rich gas, turning the hydrogen into water and the carbon monoxide into carbon dioxide. Since the operation of the engine is lean, there is enough oxygen in the exhaust to oxidize the hydrogen and the carbon monoxide.

As mentioned above in conjunction with FIG. 1, during absorber catalyst 32 regeneration the valve 30 is closed. In order for there to be continuous emission treatment for the engine 26, a tandem system including an additional absorber catalyst unit is required. In such a system, exhaust from the engine 26 will be diverted from the absorber catalyst undergoing regeneration to an additional absorber catalyst not being regenerated. Exhaust from the absorber catalyst undergoing regeneration could then be injected into the absorber catalyst not undergoing regeneration.

Figure 3:
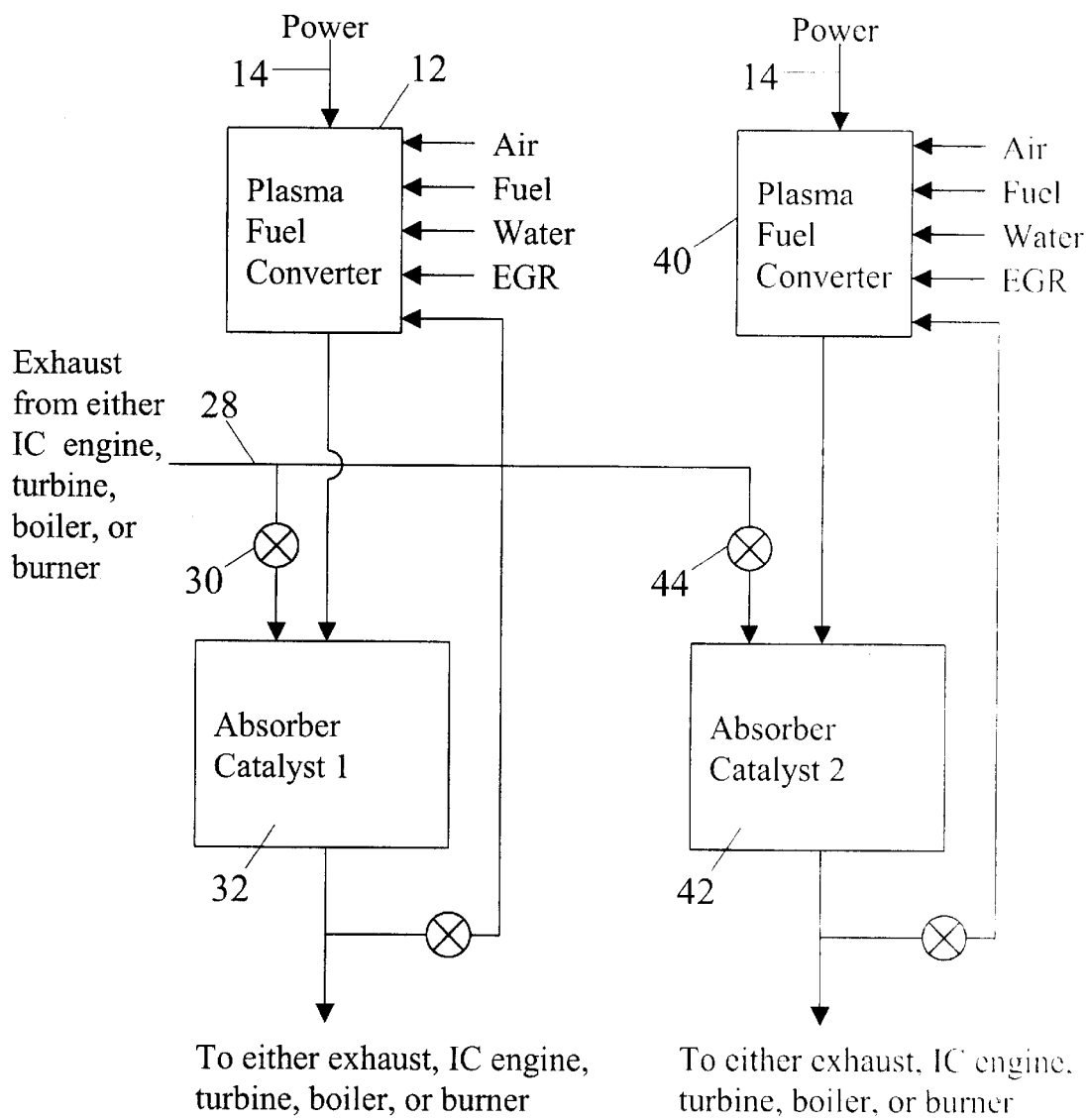
FIG. 3 is a block diagram of an embodiment of the invention using two plasma fuel converters and two absorber catalysts.

There are several variations in which the plasma fuel converter 12 can be combined with catalysts. In one embodiment, the plasma fuel converter 12 is integrated with the $NO_x$-absorber catalyst. In this integrated case, if there are two $NO_x$-absorber catalyst units there would also be two plasma fuel converters. Such an embodiment is shown in FIG. 3. In this embodiment, exhaust gas 28 will pass through the valve 30 into the absorber catalyst 32. A valve 44 is closed so that a second absorber catalyst 42 may be regenerated through the action of the reducing gas from a second plasma fuel converter 40. Once the second absorber catalyst 42 has been regenerated, the valve 44 will be to opened and the valve 30 closed so that the absorber catalyst 32 may be regenerated by hydrogen from the plasma fuel converter 12. This cycle is then repeated.

Figure 4:
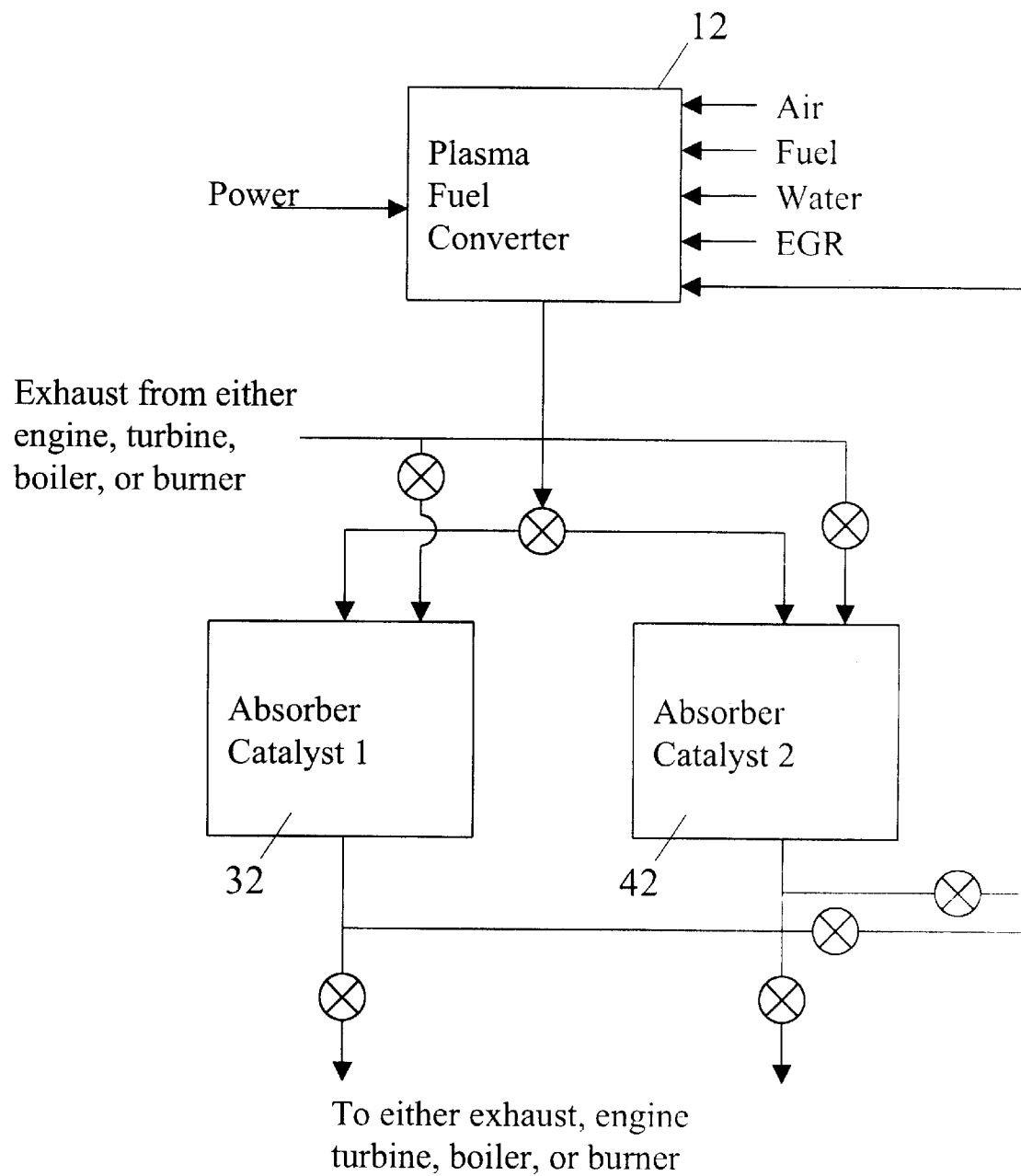
FIG. 4 is a block diagram of an embodiment of the invention utilizing a single plasma fuel converter and two absorber catalysts.

As shown in FIG. 4, a different embodiment consists of a single plasma fuel converter 12 and directing hydrogen rich gas into the absorber catalyst, 32 or 42, that is being regenerated. This embodiment saves on the cost of an additional plasma fuel converter but requires a high temperature valve. A high temperature EGR valve may be used for this purpose. In addition, if the gas from the absorber catalyst being regenerated is to be recycled, either in the engine in the plasma fuel converter 12 or in the other absorber catalyst unit, then there is needed a valve at the exhaust of the absorber catalysts to control the flow of gases as shown in the figure.

Figure 5:
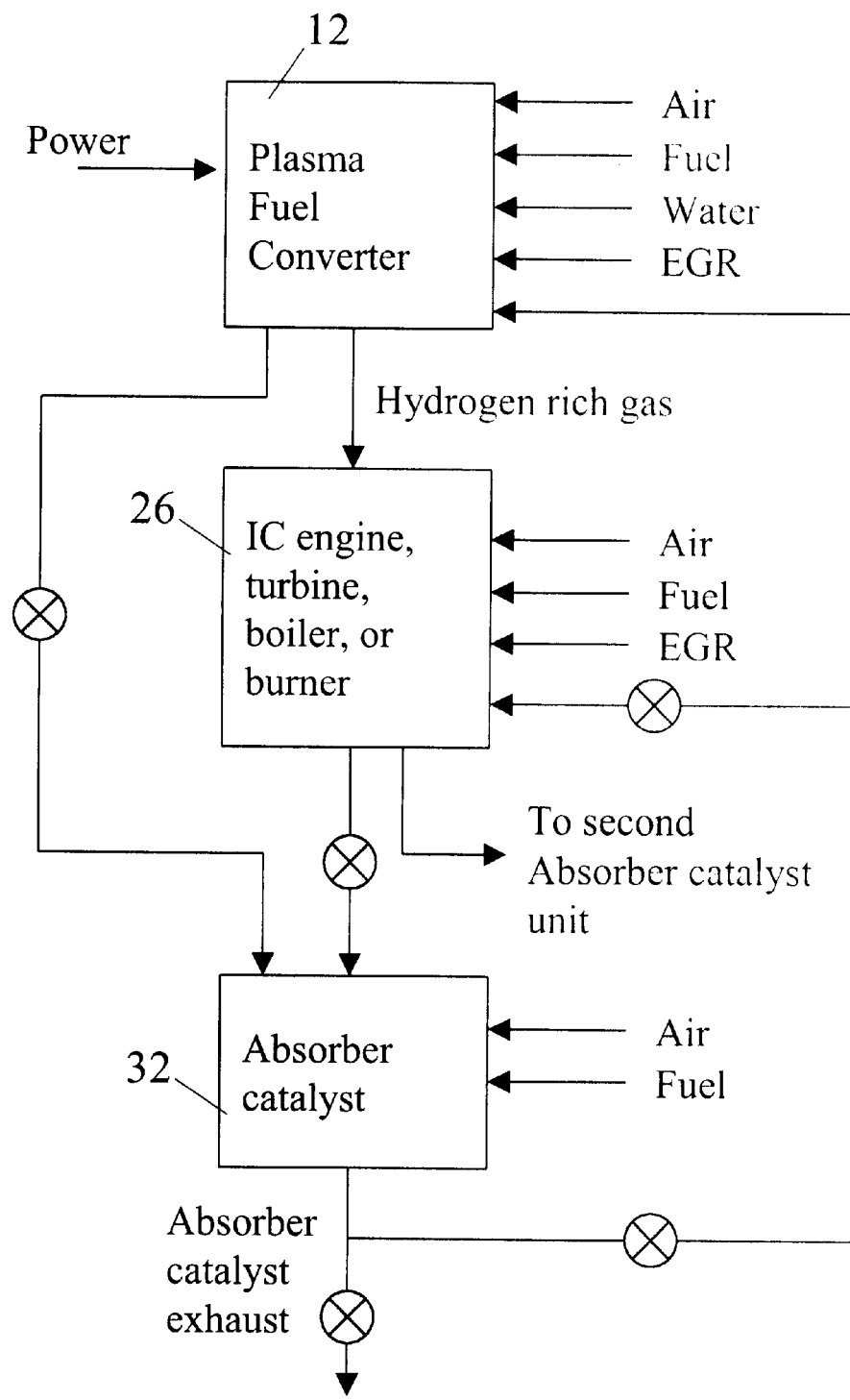
FIG. 5 is a block diagram of yet another embodiment of the invention.

The plasma fuel converter 12 may be set to operate continuously while an engine, turbine, boiler or burner is operational, with hydrogen rich gas normally used in the engine, turbine, boiler or burner to reduce emissions. During absorber catalyst regeneration, part or all of the hydrogen rich gas from the plasma fuel converter 12 can be redirected into the absorber catalyst unit as shown in FIG. 5 with a portion directed into the engine 26.

A slightly different approach to the $NO_x$ absorber catalyst is to use a Selective Catalytic Reduction (SCR) process in combination with a microplasmatron fuel converter. The catalyst in the SCR process is also called lean $NO_x$ catalyst. In the SCR process, the $NO_x$ is reduced in a catalyst by a reducing agent while the carbon monoxide and the hydrocarbons are oxidized by the oxygen present in the exhaust (which runs in the lean mode of operation). Urea or ammonia in stationary sources are being used as the reducing agents in combination with an SCR catalyst. It is possible to use hydrogen rich gas from a microplasmatron fuel converter as a reducing agent, avoiding the need of using toxic ammonia or hard to use urea.

Those skilled in the art will recognize that the systems described above may also be used, with a modification of the absorber catalyst, to treat other emissions. For example, the system could include a particulate trap that is regenerated by the injection of the hydrogen rich gas, with or without an oxidant. In such an embodiment, hydrogen rich gas is used, along with some free oxygen, for burning the particulates deposited in the particulate trap. Alternatively, if the temperature of the trap is high enough, it could be used for gasification of the particulates without the use of an oxidant. The absorbing and/or gasification process could be either homogeneous or catalytic in nature. The systems disclosed herein can be used to control emissions from sources other than internal combustion engines. These systems are applicable to gas turbines, boilers and burners for both mobile and stationary applications.

The plasma fuel converter, such as a microplasmatron, has characteristics ideal for the regenerative applications disclosed herein. The plasmatron reformate is a highly reducing gas and thus reduces $NO_x$ to $N_2$. Plasmatrons readily transform diesel fuel into hydrogen rich gas and have instantaneous turn-on and response in a very compact unit. Plasmatrons exhibit robust operation with very low average power requirements and because of the short duty cycle, system efficiency is not particularly critical. Average electrical power may be in the range of 10 to 3000 watts with peak electrical power of 100 to 30,000 watts. There is a modest electrode lifetime requirement.

The microplasmatron fuel reformer has the added advantage over conventional catalytic reformers in that it can easily process high sulfur fuel. In the plasma reforming, the sulfur is converted to hydrogen sulfide, which is much less harmful to the catalyst than other forms of sulfur. This advantage can be used directly in the case when a catalyst is combined with the microplasmatron fuel reformer, in order to increase the hydrogen conversion and to reduce the energy consumption by the microplasmatron fuel reformer.

In addition, production of hydrogen can be useful in reducing sulfur contamination of catalysts used to reduce emissions, including $NO_x$ catalyst traps. Catalyst trap regeneration using hydrogen rich gas is thus more effective in handling non-sulfur-free or sulfur reduced fuels than fuel-rich regeneration of catalyst traps, which is the conventional approach.

Illustrative characteristics of an integrated microplasmatron fuel converter-catalyst system are shown in Table 1. A DC arc plasmatron is operated in partial oxidation mode and the ratio of oxygen to fuel carbon is assumed to be approximately one (stoichiometric partial oxidation).

TABLE 1

| | | | | | |
|---|---|---|---|---|---|
| Engine $NO_x$ production | g/bhp-hr | 6 | | | |
| Engine power | hp | 30 | 60 | 120 | 240 |
| Engine $NO_x$ generation rate | g/hr | 180 | 360 | 720 | 1440 |
| Average Hydrogen rate | g/hr | 13 | 26 | 51 | 103 |
| Average electrical power requirement | W | 44 | 88 | 76 | 353 |
| Average diesel fuel to plasmatron rate | g/hr | 90 | 180 | 360 | 720 |
| Plasmatron duty cycle | % | 4% | 8% | 16% | 32% |
| Peak Hydrogen flow rate | l/min | 60 | 120 | 240 | 480 |
| Plasmatron peak power | W | 1102 | 1102 | 1102 | 1102 |
| Peak diesel fuel to plasmatron rate | g/s | 0.6 | 1.25 | 2.5 | 5 |

Figure 6:
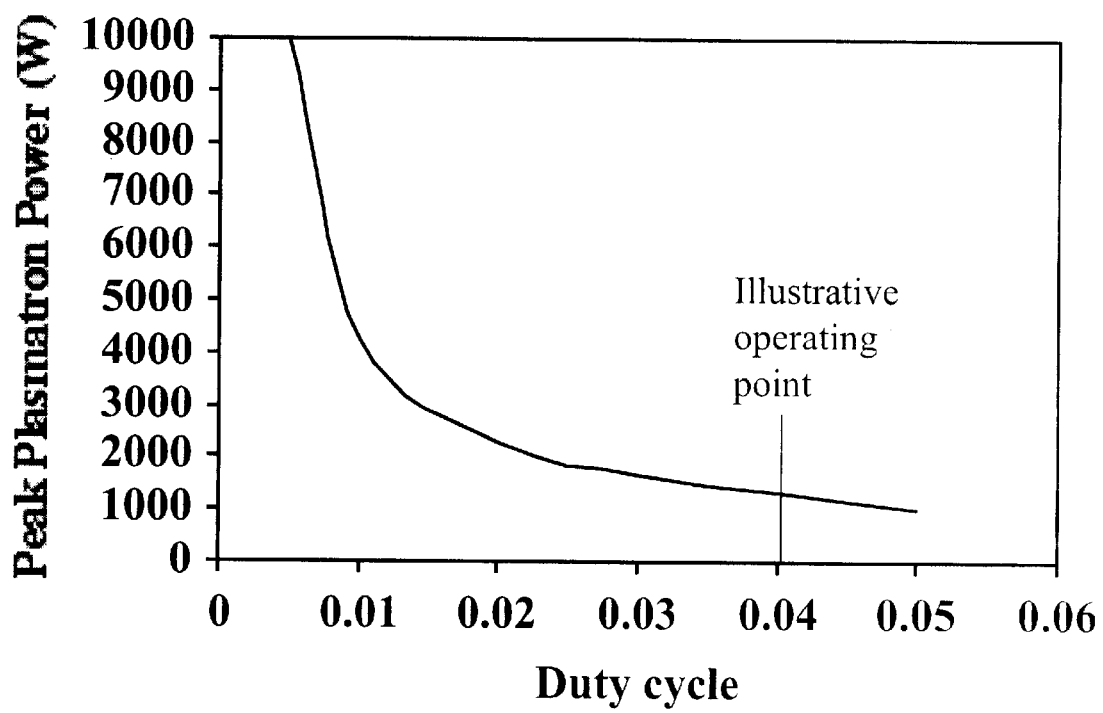
FIG. 6 is a graph of peak plasmatron power versus duty cycle.

FIG. 6 shows that for a thirty horsepower engine a plasmatron will have a 4% duty cycle resulting in plasmatron peak power of 1108 watts. Table 2 shows the system characteristics for a 1.1 kilowatt microplasmatron and 6g/hp hr $NO_x$ generated by an engine. Other plasmatrons, such as that described in our co-pending application, entitled "Low Power Compact Plasma Fuel Converter," mailed with Express Mail Label EJ217557337US, the contents of which are incorporated herein by reference, can also be used in the practice of this invention.

TABLE 2

| | | | | | |
|---|---|---|---|---|---|
| Engine Power | hp | 30 | 60 | 90 | 120 |
| Plasmatron On-time | s | 10 | 20 | 30 | 40 |
| Time between Catalyst regeneration | min | 4.1 | 4.1 | 4.1 | 4.1 |
| Plasmatron Duty Cycle | | 0.04 | 0.08 | 0.12 | 0.16 |

In the embodiments disclosed herein, a water shift reaction may be used to increase hydrogen and decrease CO concentrations. On-board hydrogen generation using plasma fuel converters according to the invention will have a major impact for diesel emission control through regeneration of $NO_x$ and particulates absorber catalysts. The plasmatron is compact and provides rapid response and robust production of hydrogen from diesel fuel. Average power is low (less than 50 W). The plasmatron electrode lifetime is long due to the low duty cycle and the cost can be under $500. Hydrogen can be used in greater amounts in the engine as an additive, further decreasing emissions.

It is recognized that modifications and variations of the invention will occur to those skilled in the art and it is intended that all such modifications and variations be included within the appended claims.

What is claimed is:

1. Emission abatement system, comprising:
   a source of emissions;
   a first catalyst for receiving the emissions;
   a plasma fuel converter for generating a reducing gas from a fuel source and connected to deliver the reducing gas into contact with the first catalyst; and
   at least one additional catalyst disposed between the plasma fuel converter and the first catalyst.

2. The emission abatement system of claim 1, wherein the first catalyst is an absorber catalyst.

3. The emission abatement system of claim 1, wherein the first catalyst is a selective catalytic reduction catalyst.

4. The emission abatement system of claim 1, 2 or 3 wherein the reducing gas is a hydrogen-rich gas.

5. The emission abatement system of claim 2 or 3 wherein the $NO_x$ absorber catalyst or selective catalytic reduction catalyst is followed by an oxidation catalyst to remove left over hydrogen and carbon monoxide from the exhaust prior to release.

6. The emission abatement system of claim 1, 2 or 3 wherein the plasma fuel converter includes a plasmatron that employs partial oxidation.

7. The emission abatement system of claim 1, 2 or 3 wherein the source of emissions is exhaust from an internal combustion engine.

8. The emission abatement system of claim 7 wherein the internal combustion engine is a diesel engine.

9. The emission abatement system of claim 7 wherein the internal combustion engine is a spark ignition engine.

10. The emission abatement system of claim 1, 2 or 3 wherein the source of emission is exhaust from a turbine, boiler or burner.

11. The emission abatement system of claim 1, 2 or 3, further including means for delivering at least a portion of effluent from the first catalyst to an input to the plasma fuel converter.

12. The emission abatement system of claim 1, 2 or 3, further including means for delivering at least a portion of effluent from the first catalyst to an input to the source of emissions.

13. The emission abatement system of claim 1, 2 or 3, further including a valve for preventing the emissions from entering the first catalyst during catalyst regeneration.

14. The emission abatement system of claim 1, 2 or 3, further including a second catalyst for receiving the emissions during regeneration of the first catalyst.

15. The emission abatement system of claim 4 further including a second plasma fuel converter for generating reducing gas for delivery to the second catalyst.

16. The emission abatement system of claim 4 further including means for delivering a portion of the hydrogen rich gas from the plasma fuel converter to an input to the source of emissions.

17. The emission abatement system of claim 16 wherein the source of emissions is an internal combustion engine, turbine, boiler or burner.

18. The emission abatement system of claim 1, 2 or 3, wherein the first catalyst treats $NO_x$ emissions.

19. The emission abatement system of claim 1, 2 or 3 wherein the emissions include particulates to be treated.

20. The emission abatement system of claim 1, 2 or 3, wherein the emissions include CO emissions.

21. The emission abatement system of claim 1, 2 or 3, wherein the plasma fuel converter is operated with an average electrical power of 10 to 3000 watts.

22. The emission abatement system of claim 1, 2 or 3, wherein the plasma fuel converter is operated with a peak electrical power of 100 to 30,000 watts.

23. The emission abatement system of claim 1, 2 or 3, wherein the fuel is not a sulfur-free or sulfur reduced fuel.

24. The emission abatement system of claim 4, wherein the hydrogen-rich gas is used to reduce sulfur from a surface of a catalyst that has been contaminated with sulfur.

\* \* \* \* \*